United States Patent
Caesar et al.

(10) Patent No.: US 6,817,193 B2
(45) Date of Patent: Nov. 16, 2004

(54) METHOD FOR OPERATING A REFRIGERANT CIRCUIT, METHOD FOR OPERATING A MOTOR VEHICLE DRIVING ENGINE, AND REFRIGERANT CIRCUIT

(75) Inventors: Roland Caesar, Stuttgart (DE); Thomas Finkenberger, Kernen-Stetten (DE); Jan Gaertner, Stuttgart (DE); Wolfgang Straub, Deggingen (DE); Juergen Wertenbach, Fellbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/300,920

(22) Filed: Nov. 21, 2002

(65) Prior Publication Data

US 2003/0115896 A1 Jun. 26, 2003

(30) Foreign Application Priority Data

Nov. 23, 2001 (DE) .......................................... 101 57 461

(51) Int. Cl.[7] ................................................ F25B 49/02
(52) U.S. Cl. ........................................ 62/133; 62/228.3
(58) Field of Search ............................ 62/228.3, 228.5, 62/133, 210

(56) References Cited

U.S. PATENT DOCUMENTS

| 5,685,160 | A | | 11/1997 | Abersfelder et al. .......... 62/114 |
|---|---|---|---|---|
| 5,877,476 | A | | 3/1999 | Yabuki et al. .............. 219/497 |
| 5,924,296 | A | * | 7/1999 | Takano et al. ................ 62/133 |
| 6,073,459 | A | | 6/2000 | Iritani .......................... 62/204 |
| 6,230,506 | B1 | | 5/2001 | Nishida et al. ............... 62/223 |
| 6,385,982 | B1 | * | 5/2002 | Ota et al. ................... 62/228.3 |

FOREIGN PATENT DOCUMENTS

| DE | 19631914 A1 | 2/1997 |
|---|---|---|
| DE | 10053203 A1 | 6/2001 |
| EP | 0786632 A2 | 7/1997 |
| EP | 0892226 A2 | 1/1999 |
| JP | 2001-108310 | 4/2001 |

OTHER PUBLICATIONS

Office Action dated Oct. 29, 2003, with attached Search Report.

* cited by examiner

*Primary Examiner*—Harry B. Tanner
(74) *Attorney, Agent, or Firm*—Crowell & Moring LLP

(57) ABSTRACT

A refrigerant circuit for a motor vehicle air-conditioning system has a refrigerant compressor, a cooler connected downstream of the refrigerant compressor, a restrictor for expanding the refrigerant, and an evaporator for transferring heat to the refrigerant. Pressure in the refrigerant circuit is measured firstly on the high-pressure side and secondly on the low-pressure side. An air-conditioning system can be driven directly or indirectly by the motor vehicle driving engine. The refrigerant in the refrigerant circuit is almost completely liquefied upstream of the restrictor, so that it is easy to determine the refrigerant mass flow. As a result, it becomes possible to determine the compressor torque which is consumed by the refrigerant circuit and to control the motor vehicle driving engine accordingly.

4 Claims, 5 Drawing Sheets

METHOD FOR OPERATING A REFRIGERANT CIRCUIT, METHOD FOR OPERATING A MOTOR VEHICLE DRIVING ENGINE, AND REFRIGERANT CIRCUIT

This application claims the priority of German application 101 57 461.4, filed Nov. 23, 2001, the disclosure of which is expressly incorporated by reference herein.

BACKGROUND AND SUMMARY OF THE INVENTION

The prior art (German publication DE 44 322 72 C2) has disclosed a refrigeration-generating system for the air-conditioning of vehicles, which comprises a compressor, a gas cooler or condenser, an internal heat exchanger, a restrictor device and an evaporator, which are connected in series and form an integral, closed vapor-compression circuit for supplying refrigeration and/or heat. A pressure which is supercritical with respect to the critical pressure of the refrigerant selected is generated on the high-pressure side of the vapor-compression circuit, and at the same time a subcritical pressure is produced on the low-pressure side of the circuit. Thermal energy is supplied to the refrigerant, which has been cooled on the low-pressure side, via the evaporator (refrigeration is dissipated). In current refrigerant circuits, the refrigerant which comes out of the evaporator enters the compressor either as superheated or saturated vapor at a low pressure, and it is then compressed to a higher pressure and a higher temperature through the supply of compressor work. The refrigerant is firstly liquefied in the condenser. The liquefaction pressure which is established, for a given condenser, is dependent on the refrigerant mass flow, i.e. on the uncompressed hot-gas mass flow and its temperature, and also the temperature of the cooling-air mass flow which dissipates the heat of condensation. When the condensation has ended, design measures enable the refrigerant to be cooled to below its condensation point. Supercooling does not always occur in a defined way in vehicle condensers, on account of the difficult thermal and hydraulic boundary conditions.

The refrigerant mass flow in the circuit is controlled by adjusting various parameters, in particular the torque and rotational speed, in the compressor. The compressor torque required is generally provided by the driving engine of the motor vehicle. With a view to achieving consumption-optimized operation of the motor vehicle driving engine, there is a need or a desire for the torque output by the driving engine to be kept at a low level, with the result that it may be the case that not every desired torque is available in every operating state. Accordingly, the maximum possible refrigerant mass flow, i.e. the permitted compressor torque, is not available at every engine operating point.

It is stated in European publication EP 1 095 804 A2 that a mass flow-controlled compressor for vehicles is realized by means of its pressure upstream and downstream of the compression and an intermediate pressure level in the compressor. The solution described in this document is based on the use of a pressure-difference control valve in the compressor. The valve controls the refrigerant mass flow as a function of the pressure difference at the compressor and the refrigerant density. This is disadvantageous in that, on account of the inaccuracy and hysteresis in the switching valve, a refrigerant mass flow of which the actual value is subject to a not insignificant deviation from the set value is established, and consequently the compressor torque can only be determined to a very unsatisfactory degree. Moreover, the pressure-difference control valve is of complex design.

One object of this invention is to provide a method for operating a refrigerant circuit. Another object is to provide a method for operating a motor vehicle driving engine. Still another object is to provide a particular refrigerant circuit.

According to one aspect of the invention, a refrigerant circuit of an air-conditioning system of a motor vehicle has a refrigerant compressor for compressing substantially gaseous refrigerant, a cooler, which is connected downstream of the refrigerant compressor, for dissipating heat from the refrigerant, a restrictor means for expanding the refrigerant, and an evaporator for transferring heat to the refrigerant. Pressure in the refrigerant circuit is measured firstly on a high-pressure side by way of at least one pressure-measuring device, and secondly on the low-pressure side by way of the at least one pressure-measuring device. The refrigerant is almost completely liquefied in the refrigerant circuit upstream of the restrictor means.

Approximately complete liquefaction of the refrigerant occurs upstream of the restrictor means (expansion valve). Complete liquefaction means that it is possible to achieve a state of the refrigerant which can be recorded unambiguously. This allows accurate and reliable determination of the refrigerant mass flow by means of thermodynamic variables, such as pressure and temperature, at the restrictor means. It is preferable for the refrigerant to be at least slightly super-cooled in order to achieve complete liquefaction. The invention allows accurate determination of the refrigerant mass flow. Together with the knowledge of the compressor rotational speed and the compressor design, it is possible to calculate the compressor torque with sufficient accuracy for torque communication with the driving engine of the vehicle. It is also possible to satisfy torque stipulations of the driving engine by setting a refrigerant mass flow. Furthermore, the refrigeration circuit can be controlled as required by utilizing the knowledge of the output provided in the refrigeration system. If the air temperature in the interior of the vehicle, which is relevant to comfort and safety, is too low, the output, i.e. the circulating refrigerant mass flow, is reduced. If the temperature in the interior of the vehicle is too high, the circulating refrigerant mass flow is increased. The variation is effected by changing the refrigerant mass flow in the compressor. The temperature of the evaporator can be determined by means of the determined and therefore known pressure downstream of the restrictor means, and it is therefore possible to reliably prevent the temperature from dropping below the freezing point, leading to icing. This makes it simple to achieve an output or comfort control of the refrigeration circuit by using knowledge of the refrigerant mass flow. As a result, there is no need to measure the temperature of the air downstream of the evaporator. This results in a high potential cost saving.

According to another aspect of the invention, the refrigerant mass flow of the refrigerant circuit is used to determine the power consumed by the air-conditioning system and the torque consumed by the air-conditioning system, and furthermore to determine the power consumed by the further consumers and the torques consumed by the further consumers. The power output by the driving engine and/or the torque output by the driving engine are/is then set as a function of the requirements of the air-conditioning system and of the consumers. This allows the torque of the driving machine to be managed according to the demands of the consumers, in particular according to the demand of the air-conditioning system. As a result, inexpensive and environmentally friendly vehicles can be operated in a targeted and user-friendly manner which is safe in traffic.

Expedient configurations of the invention are apparent from the claims, and the invention is explained in more detail on the basis of various circuit diagrams and drawings.

DETAILED DESCRIPTION OF THE INVENTION

Figure 1:
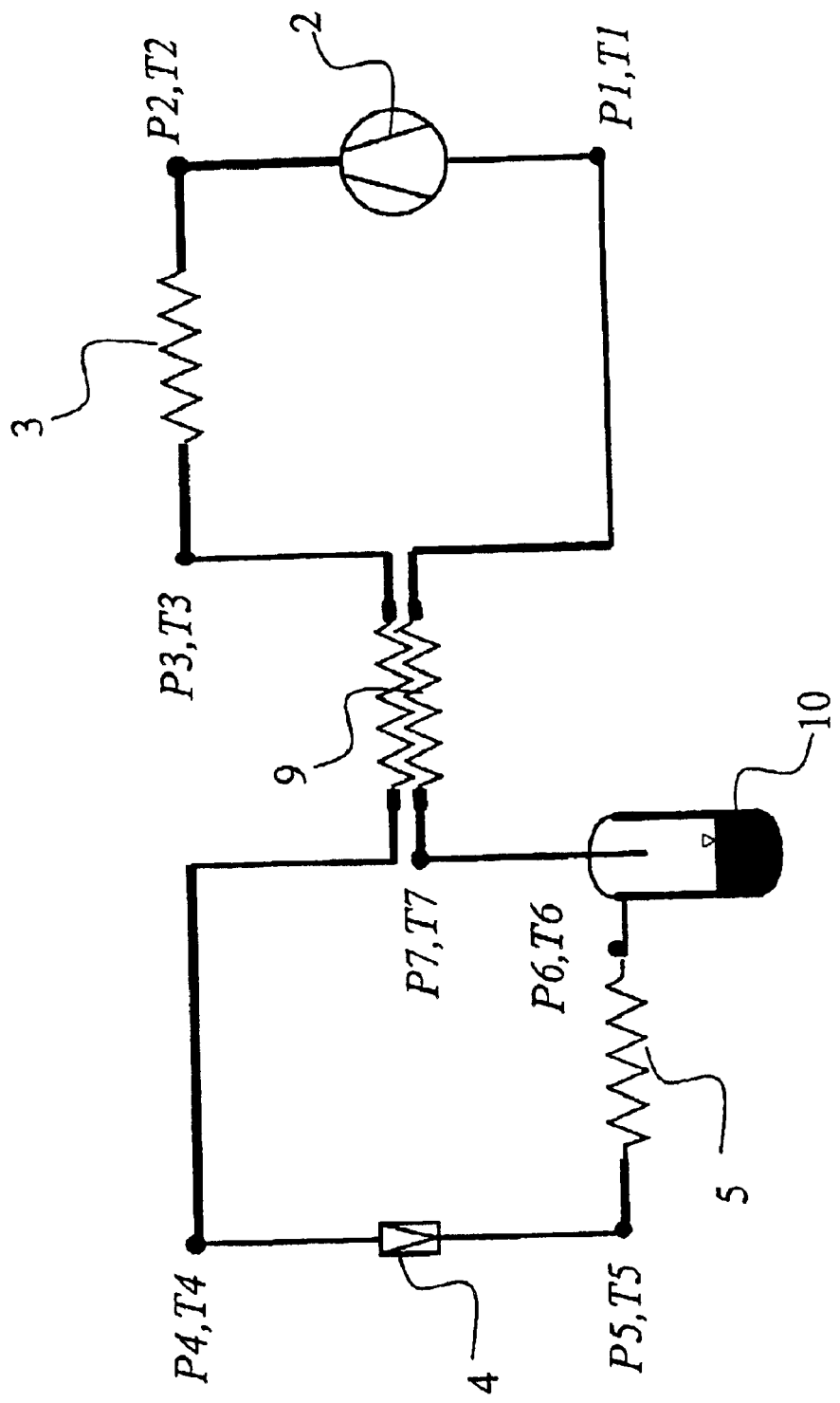
FIG. 1 diagrammatically depicts a vapor-compression circuit with a controllable compressor and a restrictor means.
Figure 2:
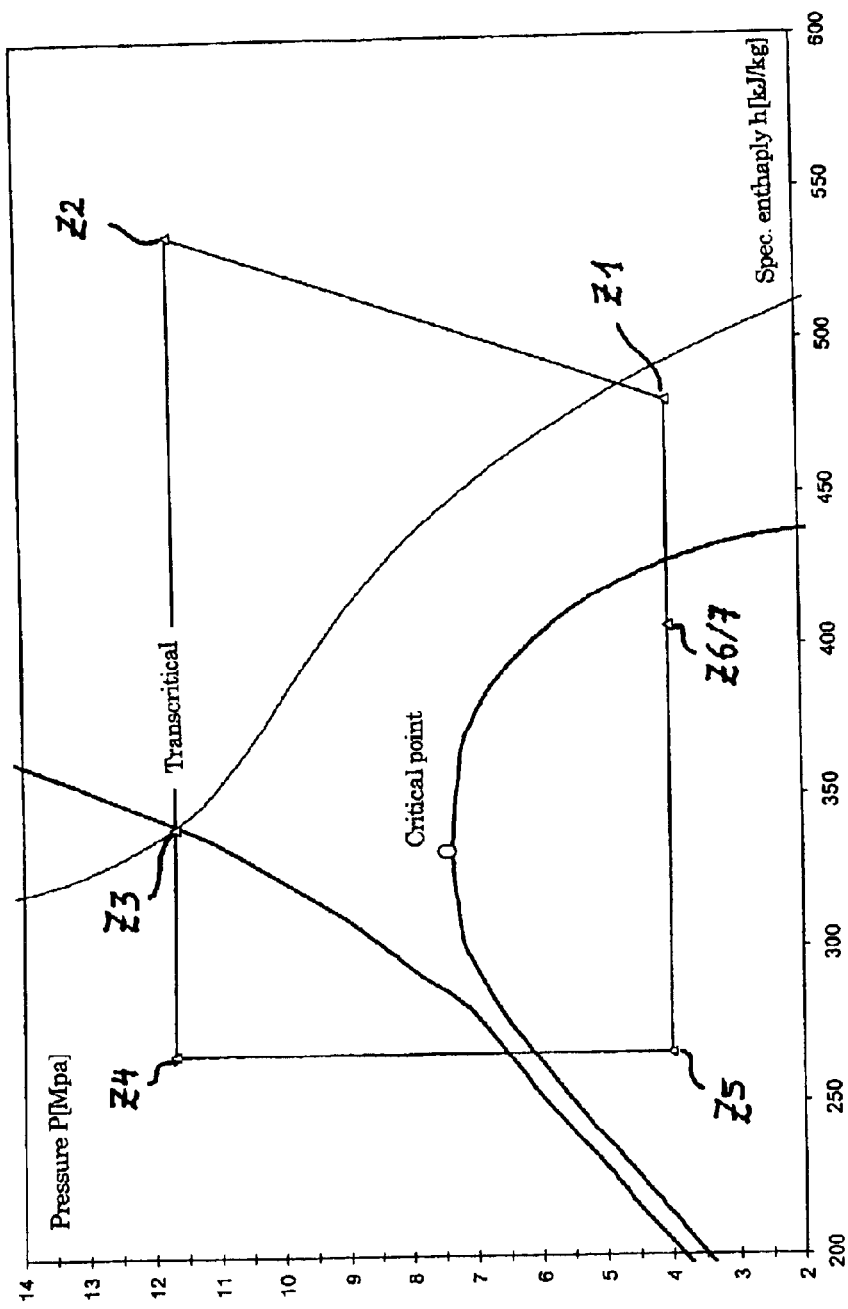
FIG. 2 shows an enthalpy-pressure diagram of a transcritical process associated with the circuit shown in FIG. 1.

FIG. 1 shows a circuit which comprises a compressor 2, a gas cooler/condenser 3, an internal heat exchanger 9, a restrictor means 4, an evaporator 5 and a collector 10 connected in series. The refrigerant mass flow of the compressor can be regulated. The restrictor means 4, which may be designed as an expansion valve, can likewise be regulated. If the compressor 2 is operating under a high load—i.e. in a transcritical refrigeration process—it compresses a refrigerant mass flow from a starting pressure P1 to a higher pressure P2 which is above the critical pressure, as shown in FIG. 2, the process temperature rising from T1 to T2. The compressed gaseous refrigerant is cooled isobarically to a temperature T3 in the gas cooler/condenser by means of a flowing coolant, such as air. The refrigerant which has been cooled in this way is then passed through the HP part of the internal heat exchanger 9, in which it is cooled still further (T4).

As it flows through the expansion valve 4, the refrigerant is expanded isenthalpically to a pressure P5 which corresponds to the starting pressure P1, the refrigerant being cooled further to a temperature T5 which lies in the liquefaction range of the refrigerant. When the gas/liquid two-phase mixture of the refrigerant formed in this way reaches the evaporator 5, a liquid fraction of the two-phase mixture evaporates as a result of the uptake of heat. The remaining fraction of the refrigerant which is still in liquid form then collects in the buffer vessel 10. The same fraction of liquid and gaseous refrigerant flows into the low-pressure part of the internal heat exchanger 9, where it is heated further and passes, from there, into the compressor 2. On account of the transcritical procedure which is set at high temperatures of the heat-dissipating cooling air at the gas cooler/condenser 3, the state of the refrigerant when it enters the restrictor means 4 is unambiguous in terms of pressure, temperature, enthalpy, entropy, density, etc. The pressure on the high-pressure side for determining the state of entry into the valve can be determined at state point 2 or 3 or 4 in the p-h diagram. To determine the pressure at the outlet of the valve, the pressure at state point 5 or 6 or 7 or 1 can be determined. The pressure drops in the circuit components can in this case be corrected in accordance with the circulating refrigerant mass flow. Only the temperature on entry to the valve is advantageously determined there, although it is also possible for other values which characterize this temperature to be used.

Figure 3:
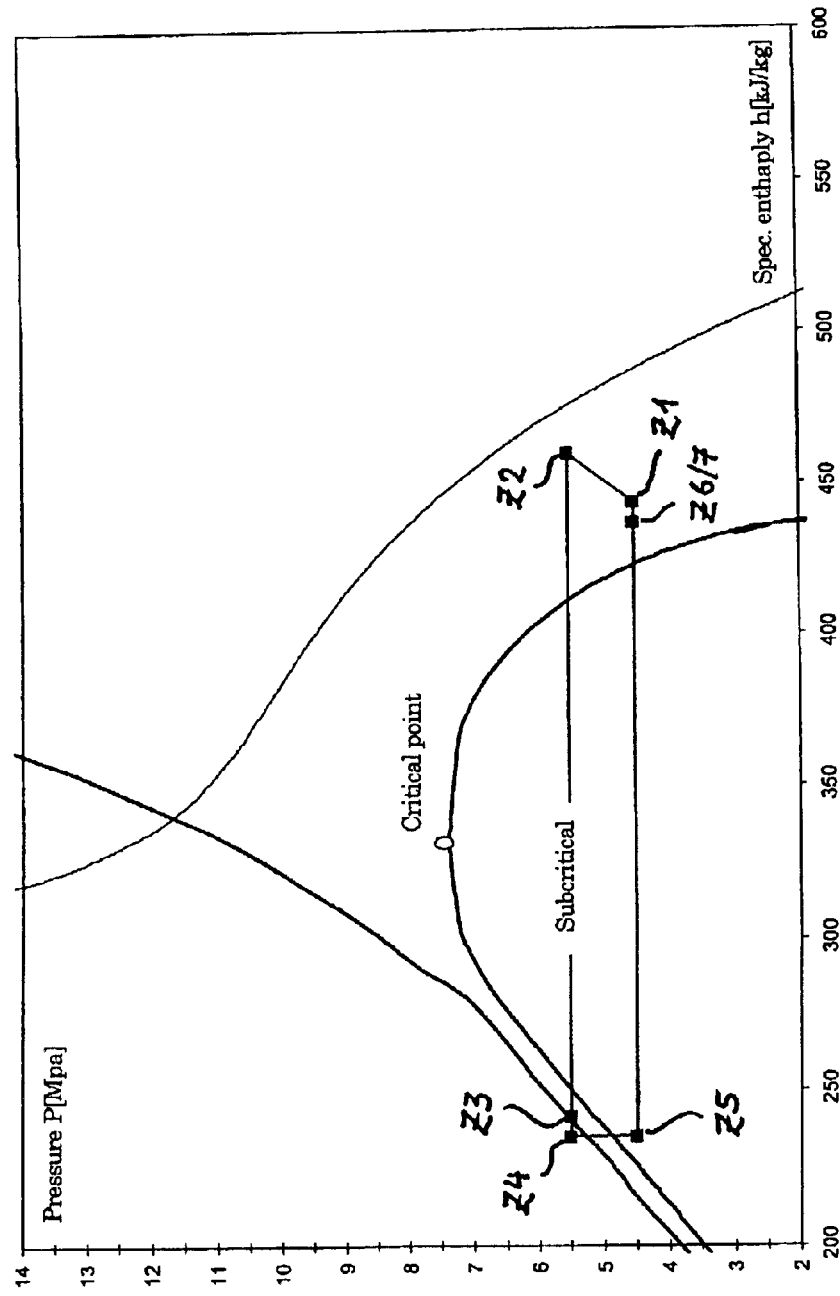
FIG. 3 shows an enthalpy-pressure diagram of a subcritical process associated with the circuit shown in FIG. 1, FIG. 4 diagrammatically depicts a restrictor means of a vapor-compression circuit with the physical values required for mass-flow determination.

If the compressor 2 is operating under a low load—i.e. with a subcritical procedure—it compresses a refrigerant mass flow from a starting pressure P1 to a higher pressure P2, which is lower than the critical pressure, as illustrated in FIG. 3, during which operation the process temperature rises from T1 to T2. The compressed gaseous refrigerant is then cooled isobarically in the gas cooler/condenser 3 by means of a flowing coolant and is liquefied. The virtually or completely liquefied refrigerant is then passed through the high-pressure part of the inner heat exchanger 9, in which it is cooled further. As it flows through the expansion valve 4, the refrigerant is isenthalpically expanded to a pressure P3, which corresponds to the starting pressure P1, the refrigerant being cooled further to the temperature T4, which lies in the liquefaction range of the refrigerant. When the gas/liquid mixture of the refrigerant which is formed in this way reaches the evaporator 5, a liquid fraction of the two-phase mixture evaporates as a result of the uptake of heat. The remaining fraction of the refrigerant which is still liquid collects in the collector 10. The same fraction of liquid and gaseous refrigerant flows into the low-pressure part of the interior heat exchanger 9, where it is heated further and then passes into the compressor 2. On account of the procedure which is established at a low cooling-air temperature at the gas cooler/condenser 3, the refrigerant state may, in an undesirable situation, still be in the two-phase range when it enters the restrictor means 4. Consequently, it is not unambiguously determined with regard to enthalpy, entropy, density, etc.

The refrigerant can be completely liquefied by controlling the restrictor-means cross section and therefore the high pressure. Supercooling ensures complete liquefaction. Reducing the restrictor cross section in the restrictor means 4 causes the pressure P2 downstream of compressor 2 to rise, and the refrigerant is liquefied in the two-phase range to the set, higher pressure/temperature level. On account of the higher temperature difference between heat-dissipating cooling air and the condensation point, supercooling is achieved. If the supercooling temperature is too high, the liquefaction pressure and therefore the condensation point can be reduced by opening the restrictor cross section in the restrictor means 4. Since the driving temperature difference at the gas cooler/condenser decreases, the supercooling is reduced in extent or disappears altogether.

Figure 4:
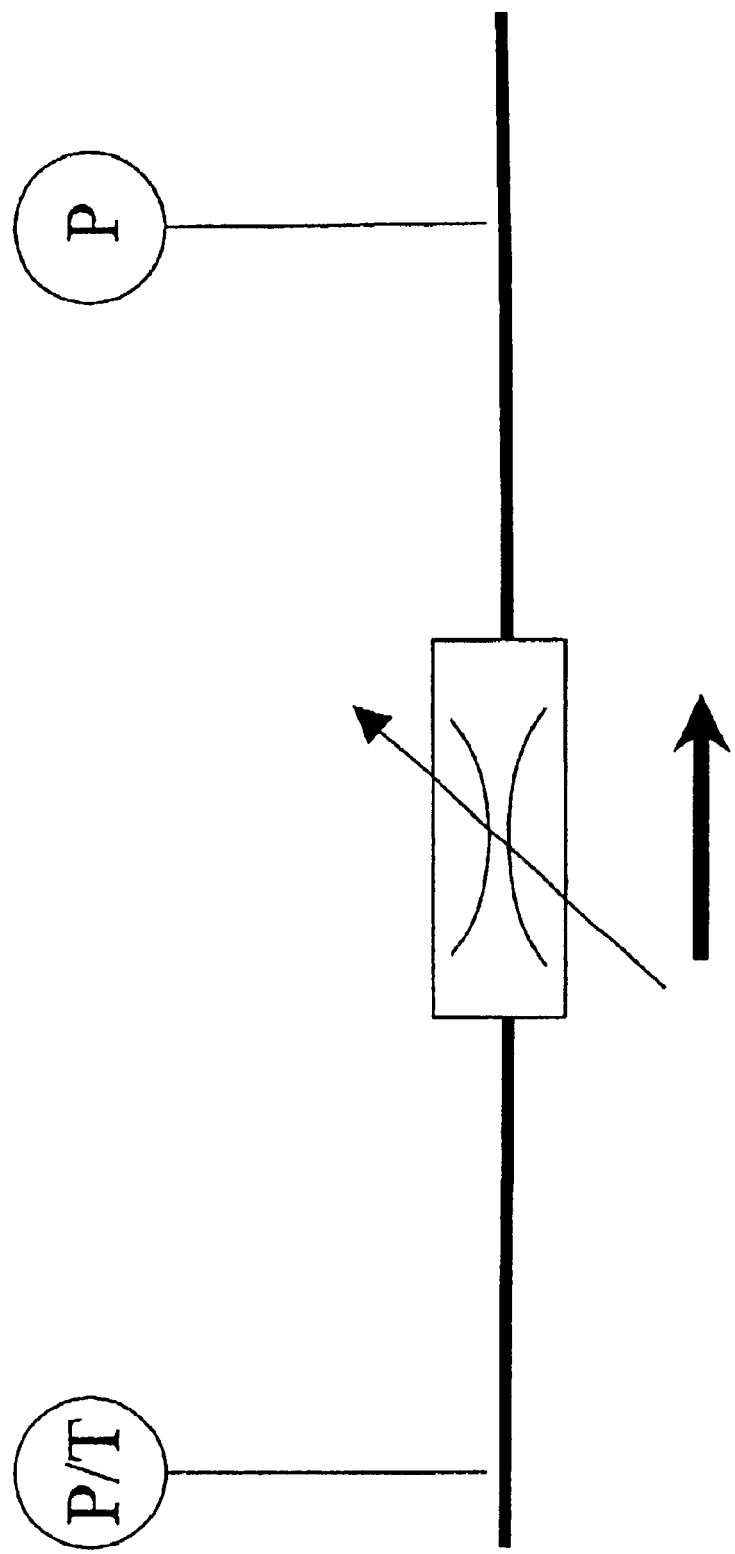

FIG. 4 shows the controllable restrictor means with the circuit and construction parameters required for unambiguous determination of the refrigerant mass flow. The unambiguously described state of the refrigerant with pressure and temperature at the inlet and the pressure at the outlet, or at least a variable which describes it, in conjunction with the knowledge of the variable valve cross section and of the refrigerant properties, allow the refrigerant mass flow to be determined precisely. This is particularly true even if a characteristic signal parameter is known instead of the valve cross section and used to determine the refrigerant mass flow. Pressure and temperature values which have been determined in the circuit, inter alia, are used to determine the refrigerant state upstream and downstream of the restrictor means 4. For example, the pressure value upstream of the valve can be measured at any desired location on the high-pressure side, for example at state point Z2 or Z3 or Z4 in the p-h diagram. The same is true of the pressure value on the low-pressure side or a variable which describes this pressure, such as the refrigerant temperature at the evaporator inlet—state point Z5—or evaporator outlet—state point Z6. Pressure drops in the circuit elements can easily be compensated for by means of a correction member. The temperature upstream of the expansion valve is advantageously measured here, although other values which characterize the variable may also be used.

The size of the expansion valve, which describes the cross section, is not dependent on the design of the restrictor means. Therefore, the restrictor-means cross section may, for example, be a function of the signal current, of the rotation angle, of the displacement, of the pressure difference, of the PWM signal for indirect control variables, such as pressure, temperature and differential pressure, and direct control variables, such as displacement, optical measuring methods and inductive cross-section recording.

Figure 5:
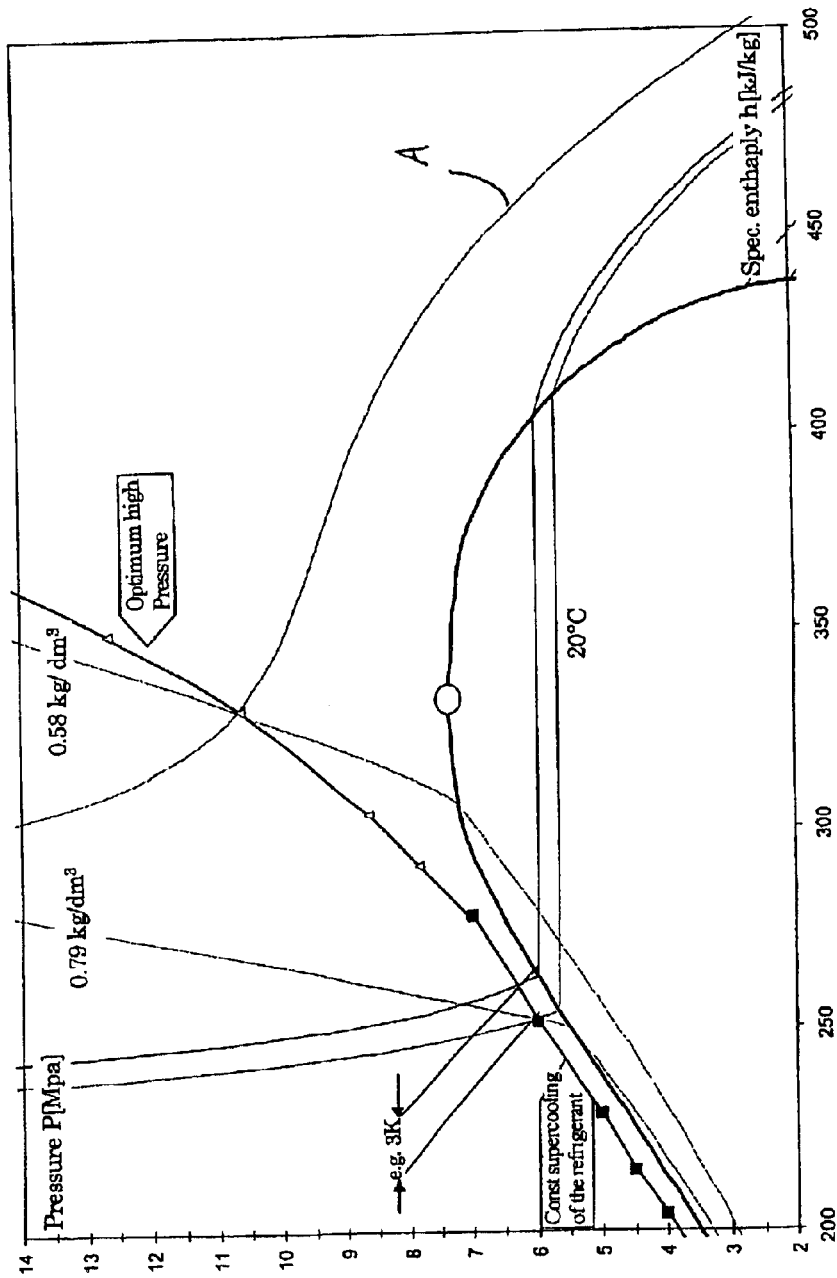
FIG. 5 shows an enthalpy-pressure diagram for the refrigerant R744 with the pairs of state values of the refrigerant at the gas cooler/condenser outlet for a transcritical or subcritical operation of the refrigeration system which is advantageous in terms of energy consumption.

FIG. 5 shows, in the enthalpy-pressure diagram for the refrigerant R744, by way of example, a curve A with the pairs of state values for the refrigerant at the gas cooler/condenser outlet. For the transcritical range, this figure illustrates the optimum high pressure which is to be set, at which the efficiency of the refrigeration circuit, described by the COP (coefficient of performance), adopts a maximum value. The curve B for the subcritical range shows supercooling of the refrigerant at the gas cooler/condenser outlet. The magnitude of the supercooling is in this case illustrated as approx. 3 K. Other values are also possible. 1 to 4 K are advantageous, since the refrigerant is supercooled further in the interior of the heat exchanger. For refrigerant temperatures at the condenser outlet of less than 10□ C., the additional supercooling by the internal heat exchanger is only very slight and then disappears almost completely at refrigerant temperatures which are even lower.

Irrespective of whether the refrigeration system is in transcritical or subcritical mode, the high pressure and the supercooling will be adjusted by varying the restrictor cross section in the restrictor means using an open-loop or closed-loop control circuit. Therefore, for control of the refrigeration system it is irrelevant whether the system is operated in a transcritical or subcritical refrigeration process. The control is defined unambiguously for all operating temperatures and pressures, and there is no need to switch over from subcritical to transcritical operation or vice versa. The desired-value curve which is selected for the pairs of state variables of the refrigerant at the gas cooler/condenser outlet can be described by two separate curves and therefore two individual equations, by a common curve and a common equation or by a plurality of supporting points.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A method for operating a refrigerant circuit of an air-conditioning system of a motor vehicle, having a refrigerant compressor for compressing substantially gaseous refrigerant, a cooler, which is connected downstream of the refrigerant compressor, for dissipating heat from the refrigerant, a restrictor means for expanding the refrigerant, and an evaporator for transferring heat to the refrigerant, comprising:

measuring a pressure in the refrigerant circuit firstly on a high-pressure side by way of at least one pressure-measuring device, and measuring a pressure in the refrigerant circuit secondly on the low-pressure side by way of said at least one pressure-measuring device, wherein the refrigerant is almost completely liquefied in the refrigerant circuit upstream of the restrictor means, and wherein the passage cross section is constantly pre-set in order to regulate the pressure level of the refrigerant circuit on the high-pressure side.

2. A method for operating a refrigerant circuit of an air-conditioning system of a motor vehicle, having a refrigerant compressor for compressing substantially gaseous refrigerant, a cooler, which is connected downstream of the refrigerant compressor, for dissipating heat from the refrigerant, a restrictor means for expanding the refrigerant, and an evaporator for transferring heat to the refrigerant, comprising:

measuring a pressure in the refrigerant circuit firstly on a high-pressure side by way of at least one pressure-measuring device, measuring a pressure in the refrigerant circuit secondly on the low-pressure side by way of said at least one pressure-measuring device, and recording the pressure of the refrigerant upstream of the restrictor means and downstream of the restrictor means, the temperature upstream of the restrictor means, and the passage cross-sectional area of the restrictor means, wherein the refrigerant is almost completely liquefied in the refrigerant circuit upstream of the restrictor means, and wherein the passage cross section is constantly pre-set in order to regulate the pressure level of the refrigerant circuit on the high-pressure side.

3. A method for operating an internal combustion engine, in which an air-conditioning system is driven directly or indirectly by the engine, comprising:

determining at least one of power consumed by the air-conditioning system and torque consumed by the air-conditioning system by way of refrigerant mass flow, determining at least one of power consumed by further consumers and torques consumed by further consumers, and adjusting at least one of power output by the engine and torque output by the engine as a function of requirements of the air-conditioning system and the further consumers.

4. The method according to claim 3, wherein said air conditioning system is a motor vehicle air conditioning system having a refrigerant compressor for compressing substantially gaseous refrigerant, a cooler, which is connected downstream of the refrigerant compressor, for dissipating heat from the refrigerant, a restrictor means for expanding the refrigerant, and an evaporator for transferring heat to the refrigerant.

* * * * *